(12) United States Patent
Gupta

(10) Patent No.: US 8,401,515 B2
(45) Date of Patent: Mar. 19, 2013

(54) METHOD AND APPARATUS FOR DYNAMIC ROUTING

(75) Inventor: Rajarshi Gupta, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 13/009,563

(22) Filed: Jan. 19, 2011

(65) Prior Publication Data

US 2011/0183644 A1 Jul. 28, 2011

Related U.S. Application Data

(60) Provisional application No. 61/297,466, filed on Jan. 22, 2010.

(51) Int. Cl.
*H04M 11/04* (2006.01)
(52) U.S. Cl. .............. 455/404.1; 455/404.2; 340/539.13
(58) Field of Classification Search ............... 455/404.1, 455/404.2; 340/539.13
See application file for complete search history.

(56) References Cited

U.S. PATENT DOCUMENTS

| 2009/0040042 A1* | 2/2009 | Lontka ..................... 340/539.13 |
| 2009/0243845 A1 | 10/2009 | Kagawa |
| 2009/0270065 A1* | 10/2009 | Hamada et al. ............ 455/404.1 |

FOREIGN PATENT DOCUMENTS

| JP | 2003151058 A | 5/2003 |
| JP | 2003242580 A | 8/2003 |
| JP | 2003345999 A | 12/2003 |
| JP | 2005017027 A | 1/2005 |
| JP | 2007087366 A | 4/2007 |
| JP | 2008158751 A | 7/2008 |
| WO | WO2007018305 A1 | 2/2007 |
| WO | WO2008133915 A1 | 11/2008 |

OTHER PUBLICATIONS

International Search Report and Written Opinion—PCT/US2011/021942—ISA/EPO—May 27, 2011.

* cited by examiner

*Primary Examiner* — Charles Shedrick
(74) *Attorney, Agent, or Firm* — Arnold J. Gum

(57) ABSTRACT

The subject matter disclosed herein relates to a system and method for emergency event routing. One or more routing instructions may be determined to route one or more individuals away from a location corresponding to the emergency event based at least in part on at least one category associated with the emergency event, a type of the emergency event, and one or more estimated locations of one or more mobile devices associated with the one or more individuals.

69 Claims, 7 Drawing Sheets

METHOD AND APPARATUS FOR DYNAMIC ROUTING

CROSS-REFERENCES TO RELATED APPLICATIONS

The present patent application claims priority to U.S. provisional patent application Ser. No. 61/297,466, entitled "Dynamic Emergency Routing," filed on Jan. 22, 2010, which is assigned to the assignee hereof and which is expressly incorporated herein by reference.

BACKGROUND

1. Field

The subject matter disclosed herein relates to dynamic routing for a mobile device.

2. Information

In any large indoor location, emergency evacuation plans and procedures are of utmost importance. For example, plans for evacuating a hotel, stadium, or other structure or area may save lives in the event of an emergency such as a fire. Such evacuation plans may guide individuals to a nearby exit to leave such a structure and to reach a safe location away from such an emergency.

In some implementations, various maps may be posted throughout a structure, such as within individual hotel rooms to direct individuals to a nearby exit in the event of an emergency situation. However, such maps posted in hotel rooms are static, e.g., unchanging, and may not be useful to an individual if an emergency situation, such as a fire, has occurred near a particular exit, thereby preventing the individual from reaching the exit and causing the individual to look for a different exit.

BRIEF DESCRIPTION OF THE FIGURES

Non-limiting and non-exhaustive features will be described with reference to the following figures, wherein like reference numerals refer to like parts throughout the various figures.

SUMMARY

Figure 1:
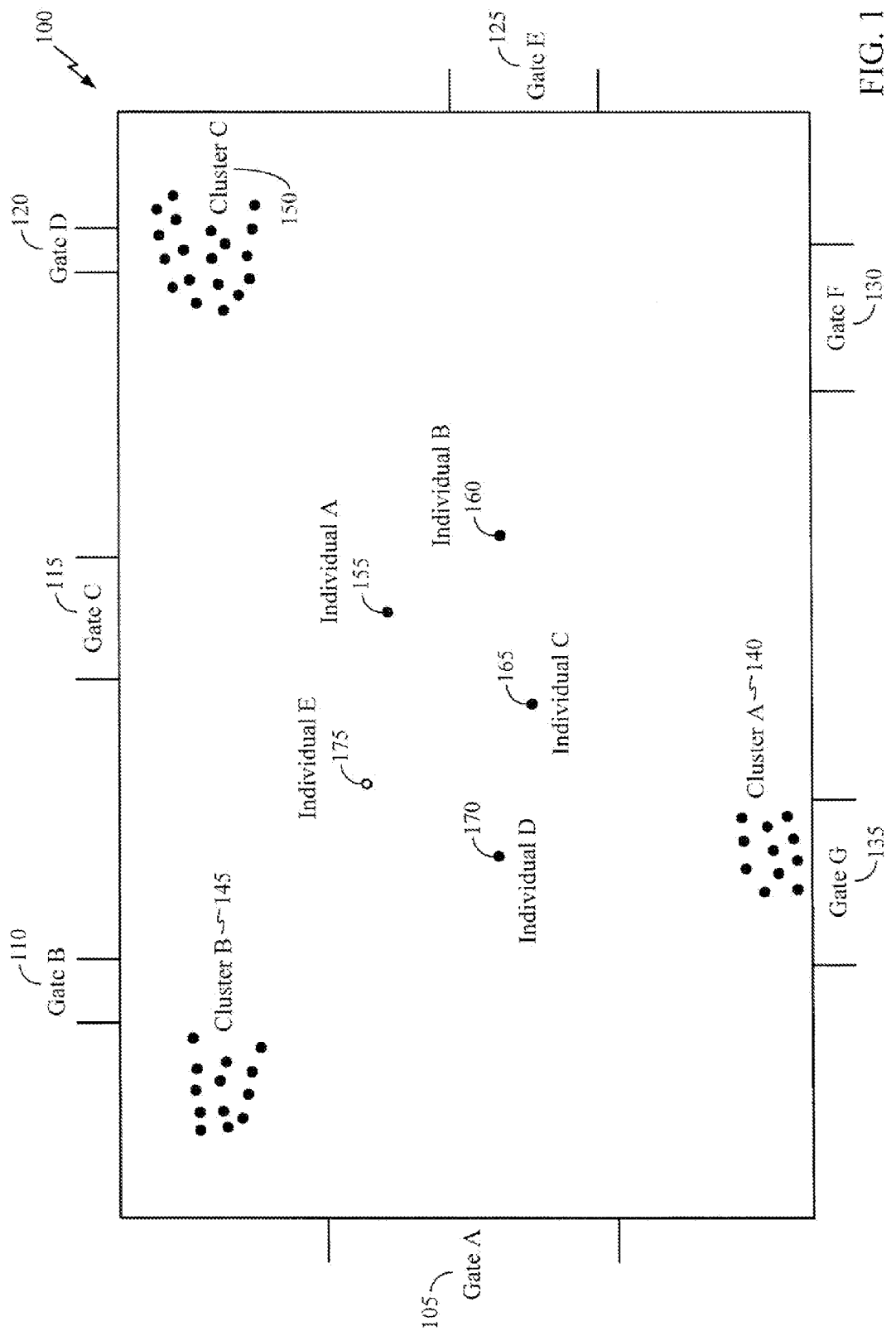
FIG. 1 illustrates a view of an enclosed area according to one or more implementations.

In one particular implementation, a method is provided for receiving one or more signals indicating a type of an emergency event and an emergency event location associated with an area. One or more routing instructions may be determined to route one or more individuals away from the emergency event location based at least in part on an emergency event location, a type of emergency event, and one or more estimated locations of one or more mobile devices associated with one or more individuals. The one or more routing instructions may be transmitted to one or more mobile devices associated with one or more individuals.

In another implementation, an apparatus is provided that has a receiver, transmitter, and a processor. A receiver may receive one or more input signals transmitted in a communications network. A transmitter may transmit one or more output signals. At least one of the one or more input signals may indicate an area associated with an emergency event location. A processor may determine one or more routing instructions to route one or more individuals away from an emergency event location corresponding, to an emergency event based at least in part on an emergency event location, a type of emergency event, and one or more estimated locations of one or more mobile devices associated with one or more individuals. The processor may also initiate transmission of one or more routing instructions to one or more individuals via the transmitter.

In another implementation, an apparatus is provided that may include a means for receiving one or more signals indicating a type of an emergency event and an emergency event location associated with an area. A means for determining one or more routing instructions may determine one or more individuals away from the emergency event location based at least in part on an emergency event location, a type of emergency event, and one or more estimated locations of one or more mobile devices associated with one or more individuals. A means for transmitting may transmit one or more routing instructions to one or more mobile devices associated with one or more individuals.

In a particular implementation, an article is provided that may include a storage medium comprising machine-readable instructions executable by a special purpose apparatus. The machine-readable instructions are executable to process one or more signals indicating an emergency event occurring within an emergency event location associated with an area. The machine-readable instructions are also executable to determine one or more routing instructions to route one or more individuals away from the emergency event location corresponding to the emergency event based at least in part on an emergency event location, a type of emergency event, and one or more estimated locations of one or more mobile devices associated with one or more individuals. The machine-readable instructions are executable to initiate transmission of the one or more routing instructions to the one or more mobile devices associated with the one or more individuals.

In another implementation, a method is provided for receiving, by a mobile device, a signal indicating a type of an emergency event and an emergency event location associated with an area. One or more routing instructions may be determined to route an individual away from the emergency event location based at least in part on an emergency event location, a type of emergency event, and one or more estimated locations of one or more mobile devices associated with one or more individuals. The one or more routing instructions may be presented to the individual.

In another implementation, an apparatus is provided that has a processor and an output device. The processor may process one or more wireless signals received from a communications network and indicating a type of an emergency event and an emergency event location within an area. The processor may also determine one or more routing instructions to route an individual away from the emergency event location based at least in part on an emergency event location, a type of emergency event, and one or more estimated locations of one or more mobile devices associated with one or more individuals. The output device may present one or more routing instructions to an individual.

In another implementation, an apparatus is provided that may include a means for processing one or more wireless signals indicating a type of an emergency event and an emergency event location within an area. A means for determining may determine one or more routing instructions to route an individual away from the emergency event location based at least in part on an emergency event location, a type of emergency event, and one or more estimated locations of one or more mobile devices associated with one or more individuals. A means for presenting may present the one or more routing instructions to the individual.

In another implementation, an article is provided that may include a storage medium comprising machine-readable instructions executable by a special purpose apparatus. Machine-readable instructions are executable to process one or more wireless signals indicating a type of an emergency event and an emergency event location within an area. Machine-readable instructions are further executable to determine one or more routing instructions to route an individual away from the emergency event location based at least in part on an emergency event location, a type of emergency event, and one or more estimated locations of one or more mobile devices associated with one or more individuals. Machine-readable instructions are also to generate one or more electronic signals to present one or more routing instructions to an individual.

It should be understood, however, that the implementations above are merely examples, and that claimed subject matter is not limited in this respect.

DETAILED DESCRIPTION

Reference throughout this specification to "one example", "one feature" "an example" or "a feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

In one or more implementations, an emergency routing system may be implemented to generate routing instructions to direct one or more individuals away from a location of an emergency event detected within an enclosed area. An "emergency event," as used herein may refer to an event away from which individuals may be directed for safety or security reasons. Examples of emergency events include fires, broken windows, a security breach at an airport, or a bomb threat, to name just a few among many possible examples of emergency events. If an emergency event has been detected within an enclosed area where a number of individuals are currently located, such individuals may be routed-away from the emergency event to a safer area, for example.

An "enclosed area," as used herein may refer to an area associated with physical or structural boundaries. An enclosed area may comprise an indoor location or an outdoor location. Examples of enclosed areas comprising indoor locations include office or residential buildings, shopping malls, sports stadiums, airport terminals, and parking structures, to name just a few among many different examples. Examples of enclosed areas comprising outdoor locations include amusements parks, zoos, recreational parks, and outdoor stadiums, to name just a few among many different examples. For example, outdoor enclosed areas may be bounded by fences, walls, or some other physical structure or partition.

In a large enclosed area, for example, an element of planning includes that of evacuation in the event of an emergency event. For example, an emergency evacuation plan for evacuating individuals from an indoor enclosed area, such as a shopping mall, movie theater, stadium, hospital, or airport, for example, may be critical to ensure safety of individuals within the enclosed area. Indoor enclosed areas within certain jurisdictions may be subject to various zoning ordinances to ensure public safety. Building plans, for example, may be subject to review to ensure that there are a sufficient number of exits from within a building. Given the specter of recent terrorist activities, for example, airports provide a critical example of a large enclosed indoor location whose emergency operations are put to test with alarming regularity.

Architectural planning may ensure that there are an adequate number of exits within an indoor enclosed area. However, it is also desirable to have an orderly mode of exit for individuals from such an indoor enclosed area in response to an emergency event. This is particularly true in stadiums or at concerts, for example, where an emergency event may result in far more injuries/fatalities caused due to crowd stampedes than the actual emergency itself. Efforts to alleviate this challenge include use of clearly marked exit signs, large doors that open outwards, and signs directing individuals to a nearest exit, to list just a few among many examples.

Unfortunately, however, emergency routing plans in most implementations are static or unchanging, regardless of a nature or other factors associated with an emergency event. Such emergency routing plans may not account for an exact location of an emergency event. For example, an emergency event such as a fire occurring near gate B2 of an airport terminal may require different exit strategies to safely evacuate individuals away from the emergency event than would be implemented if the fire were instead occurring near gate B23 of the airport terminal.

Implementations with static routing plans may not account for a current population present in a particular locale. For example, an emergency event such as a bomb scare at a train station occurring during busy rush hour commuting hours may require different evacuation plans than if the same emergency event were to occur in the middle of the night when the train station is far less crowded. At night, for example, it may be sufficient to announce an evacuation, brightly point out the exits, and allow the relatively few people present to find a nearest exit. An emergency event occurring during busy rush hours where many passengers are present, on the other hand, may be responded to with different routing instructions to control panic and may utilize exits efficiently. Such emergency routing during rush hours may also potentially utilize unconventional exit routes, such as those across railroad tracks.

Static routing plans may also fail to account for a particular nature of an emergency event. For example, an earthquake may be addressed by evacuating people out of an indoor enclosed area as soon as possible, onto open ground, or potentially onto a runway at an airport. On the other hand, an emergency event such as a security breach at an airport, for example, may be addressed by directing passengers to exit an affected terminal back on to a main airport building in a specific direction.

Emergency routing within an enclosed area may be improved in one more implementations as discussed herein by providing a more dynamic system to account for a type of emergency event and current conditions associated with the emergency event, such as a nature of the emergency event and/or a number of individuals within a relatively close proximity of the emergency event. According to one or more implementations, routing instructions may be determined dynamically, such as by a remote server, for example, and transmitted or broadcast to mobile stations associated with individuals within an enclosed area or near the enclosed area associated with an emergency event.

According to one or more implementations, an application program may be executed or otherwise run on a mobile device accessible by and co-located with an individual located within an enclosed environment. Some mobile devices have a varied degree of capability and an emergency routing capability may provide a different degree of service to an individual depending on the mobile device's capability.

A mobile device with Internet connectivity, for example, may download a static emergency map of an enclosed area from a website or other, network address hosted by or associated with the indoor enclosed area. Such an emergency map may indicate exit routes if displayed on a display screen or display device of a mobile device, for example. For example, a processor of a mobile device may be adapted to generate one or more electronic display signals to cause exit routes to be displayed on a display screen. In some implementations, exit routes may be audibly presented to an individual via a speaker or headphones of a mobile device, for example. For example, a processor of a mobile device may be adapted to generate one or more electronic audio signals to cause exit routes to be audibly presented to an individual via a speaker or headphones. If a mobile device has location determination capabilities, such a static emergency map may be periodically updated to indicate the mobile device's last known location or position.

In some implementations, a mobile device may download an emergency map for an enclosed area if the mobile device crosses a boundary of the enclosed area or reaches a predefined range of the enclosed area, for example. In some implementations, a network element may broadcast a network address from which an emergency map may be downloaded by a mobile device.

FIG. 1 illustrates a view of an enclosed area 100 according to one or more implementations. In this example, enclosed area 100 comprises an airport terminal with, several exit points, such as Gate A 105, Gate B 110, Gate C 115, Gate D 120, Gate E 125, Gate F 130, and Gate G 135. Individual people are represented by dots shown in FIG. 1. As shown, there are three clusters or groupings of individuals within enclosed area 100—Cluster A 140, Cluster B 145, and Cluster C 150. Such clusters may depict individuals located near a gate and who have gathered to board an airplane, for example. There are also some individuals who are located far away from any clusters and therefore are not considered to be a part of any of the clusters. In this example, Individual A 155, Individual B 160, Individual C 165, Individual D 170, and Individual E 175 are depicted.

As shown in FIG. 1, there are numerous individuals located within enclosed area 100. If an emergency event is detected or reported, individuals may be given different exit instructions based at least in part on one or more factors, as discussed below.

Figure 2:
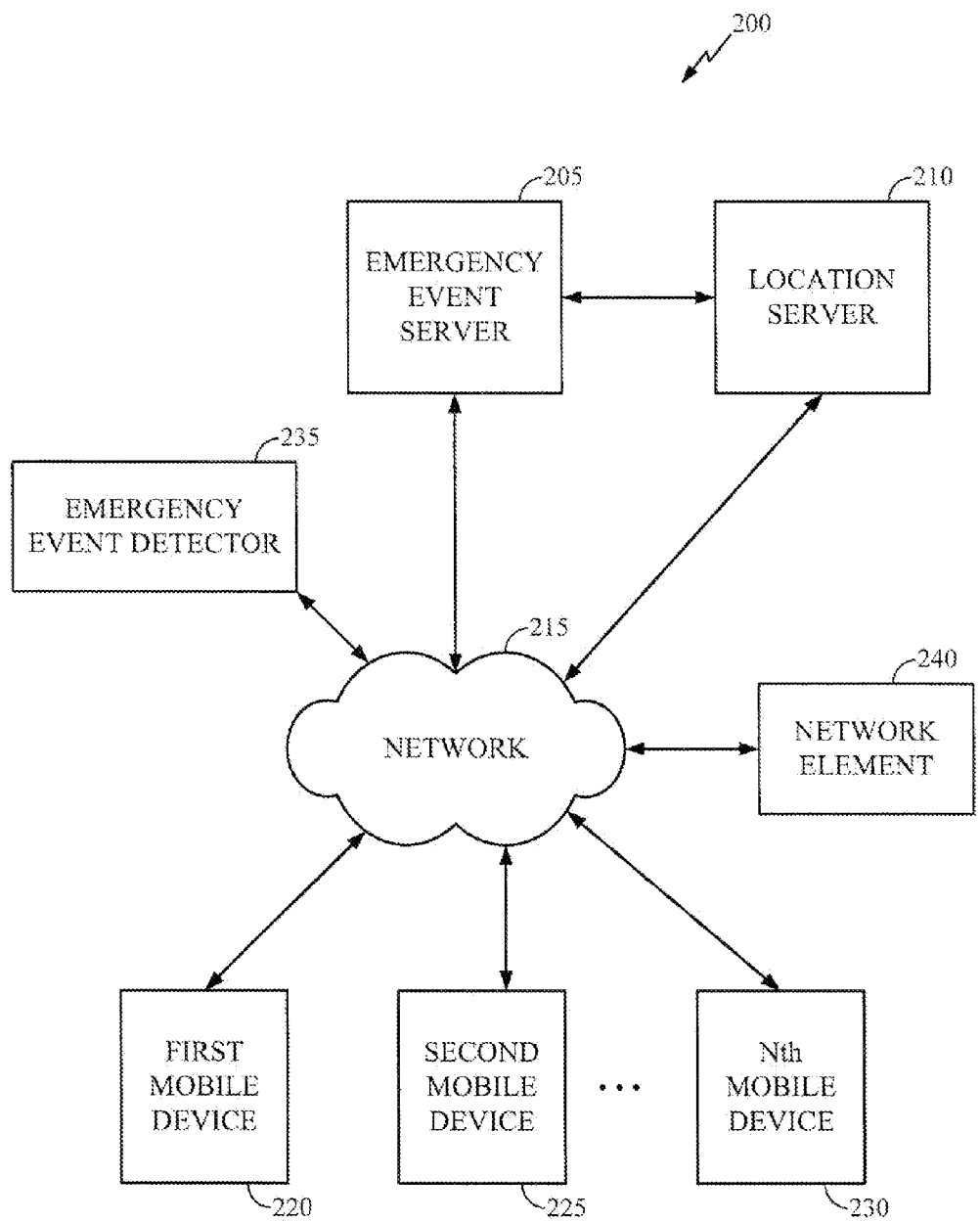
FIG. 2 is a schematic block diagram of a system for determining routing instructions to route one or more mobile devices away from one or more emergency event according to one or more implementations.

FIG. 2 is a schematic block diagram of a system 200 for determining routing instructions to route one or more mobile devices away from one or more emergency event according to one or more implementations. As shown, system 200 includes several elements, such as an emergency event server 205, a location server 210, a network 215, and one or more mobile devices, such as first mobile device 220, second mobile device 225, and additional mobile devices up to Nth mobile device 230. System 200 may also include an emergency event detector 235 and a network element 240. Network 215 may comprise a communications network, for example.

Emergency event server 205 may receive information from an emergency event detector 235. Emergency event detector 235 may detect certain types of emergency events. For example, an emergency event detector 235 may comprise a smoke detector to detect smoke from a fire. Emergency event detector 235 may also comprise a silent alarm system, for example, that may be utilized by an employee within an enclosed area to indicate that a certain type of emergency event is occurring, such as a bomb threat within an airport or some other security breach. Other examples of emergency event detectors include security sensors to detect whether a window has been broken or a thermometer that may detect whether ambient temperature is beyond a predefined threshold. Here, an ambient temperature higher than a predefined threshold may indicate that heat from a fire has caused the ambient temperature to rise above the predefined threshold. On the other hand, an ambient temperature lower than a predefined threshold during cold winter months, for example, may indicate that a window is broken and that there may potentially be dangerous glass from the window on the floor near the window. It should be appreciated that multiple detectors may be utilized to detect an emergency event. For example, emergency event server 205 may receive emergency event information from a variety of emergency event detectors. In addition, emergency event server 205 may also receive information indicative of an emergency event from a device other than emergency event detector 235. For example, a 911 operator may contact emergency event server 205 to report an emergency event or an individual with a mobile device may transmit a message, such as an email or Short Message Service (SMS) message to an address associated with emergency event server 205 to report an emergency event within an enclosed area.

One or more mobile devices, such as first mobile device 220, second mobile device 225, and other mobile devices up to Nth mobile device 230 may be located within an enclosed area. In one particular implementation, a mobile device may estimate its location based on navigation signals received from a Satellite Positioning System (SPS), such as GPS or Galileo by, for example, correlating pseudorange measurements from several (e.g., four or more) transmitters.

However, a mobile device may be utilized within an area where navigation signals from a Satellite Positioning System (SPS) are not available, such as, for example, within certain indoor enclosed areas. In one implementation, a mobile device may estimate its location based on signals wirelessly received from wireless network elements such as network element 240 shown in FIG. 2, e.g., or other devices capable of wirelessly transmitting or broadcasting signals. Wireless network elements, such as wireless local area network (WLAN) access points, may be located throughout such an area at known locations and a mobile device may estimate ranges from the mobile device to particular wireless network elements (e.g., by measuring received signal strength and/or round-trip delay). Such ranges can be estimated, and a location of such a mobile device may be triangulated using known techniques.

In one or more implementations, a mobile device may determine its location based at least in part on wireless communications with at least one other wireless device associated with a known location, such as an access point or another mobile device, for example. In one or more implementations, a mobile device may receive a location information, such as a location estimate, from another wireless device via a Wi-Fi, radio, Bluetooth, or Ultra-wideband (UWB) communication, to name just a few among many different types of wireless communications. In some implementations, a mobile device may estimate its range from an access point or another mobile device based at least in part on a Receive Signal Strength Indication (RSSI) of a communication from the access point or other mobile device, for example. In some implementations, a mobile device may estimate its range from an access point or another mobile device based at least in part on a Round Trip Time delay (RTT), for example, to estimate its range from a wireless device based at least in part on a measured length of time for a wireless signal to travel from the wireless device to the mobile device.

In some implementations, a mobile device may transmit an estimate of its location to location server 210 and may also register with the location server 210 or with emergency event server 205. For example, first mobile device 220 may transmit an identifier and its location estimate to location server 210 and may receive an acknowledgment from the location server 210 to indicate registration. In some implementations, a network address of location server 210 may be broadcast by network element 240 to mobile devices within an associated enclosed area. Alternatively, first mobile device 220 may transmit a probe request and, upon receipt, network element 240 may respond to first mobile device 220 with a network address of location server 210. In some implementations, signs may be posted within an enclosed area to inform an individual of a network address for location server 210 or a manner in which first mobile device 220 may register with location server 210.

Location server 210 may store estimated locations of one or more mobile devices that are registered. Accordingly, location server 210 may effectively monitor movement of mobile devices within an enclosed area based at least in part on estimates of locations of such mobile devices. If an emergency event has occurred and emergency event server 205 has been informed of the emergency event, emergency event server 205 may inform location server 210 of the emergency event. Location server 210 may determine which mobile devices are located within a certain proximity of the emergency event and may determine routing instructions to route one or more individuals away from the emergency event. If an emergency event occurs, a signal may be transmitted from an emergency event detector to emergency event server, for example. Examples of routing instructions may include instructions such as "turn left," turn right," and "exit through Gate A," to name just a few among many different routing instructions. Routing instructions may be transmitted individually to mobile devices that are registered with location server 210. For example, if a large number of individuals are located near a relatively small exit, some of the individuals may be routed to one exit, whereas other individuals may be routed to another exit. If a mobile device is registered with location server 210, the location server 210 may determine which individuals to route to a first exit and which individuals to route to a second exit, and may transmit specific routing instructions to registered mobile devices of such individuals.

In some implementations, some individuals may be registered with location server 210, whereas some individuals may not be registered with location server 210. In such an example, individual messages may be sent to one or more of the individuals having mobile devices registered with location server 210 to direct such individuals to a particular exit point. On the other hand, individuals have mobile devices that are not registered with the server may instead receive messages instructing such individuals to exit through a different exit point in some implementations to minimizes congestion at various exits.

Figure 3:
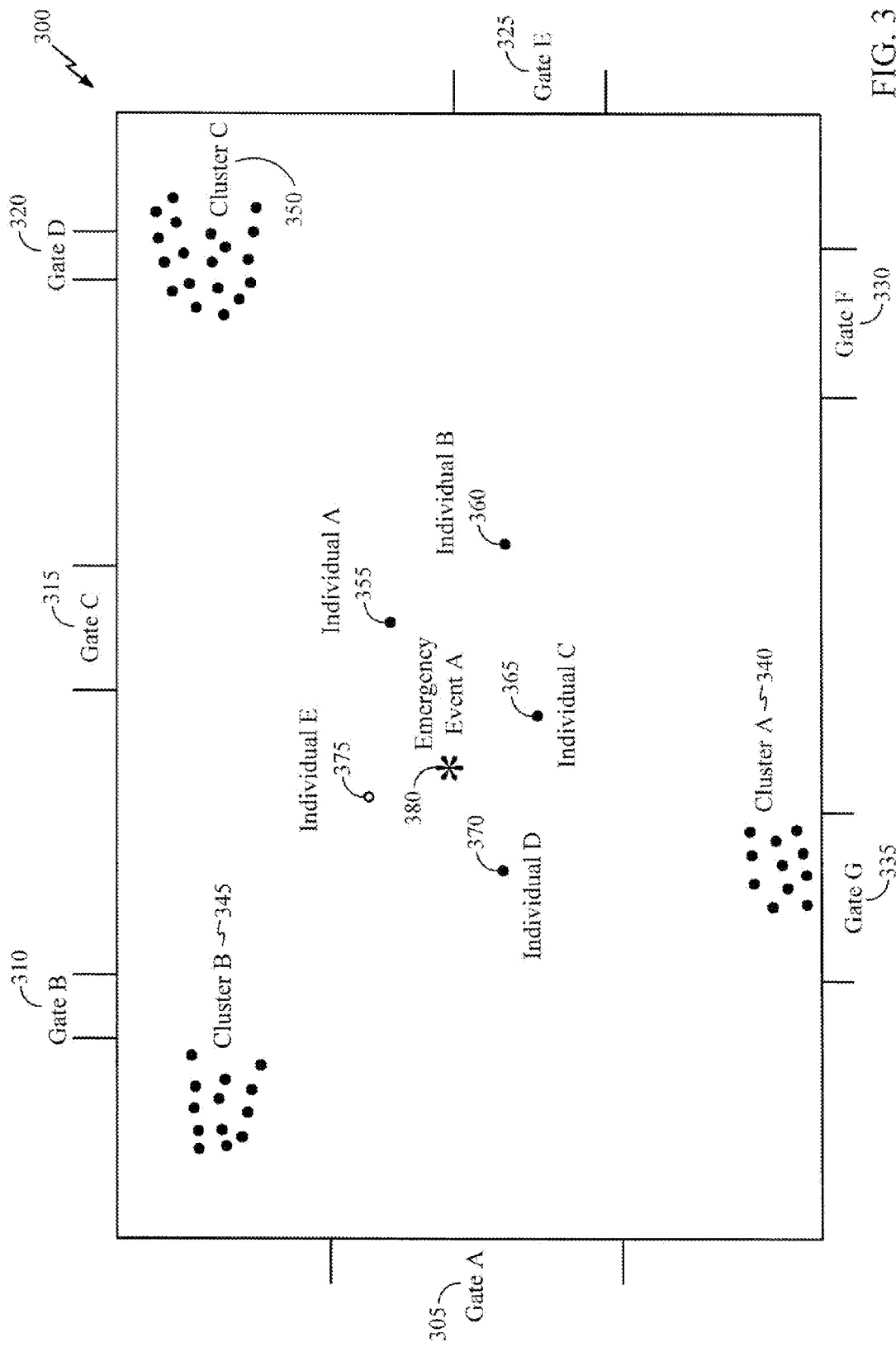
FIG. 3 illustrates a view of an enclosed area according to one or more implementations.

FIG. 3 illustrates a view of an enclosed area 300 according to one or more implementations. In this example, enclosed area 300 comprises an airport terminal with several exit points, including Gate A 305, Gate B 310, Gate C 315, Gate D 320, Gate E 325, Gate F 330, and Gate G 335. Individual people are represented by dots shown in FIG. 3. As shown, there are three clusters or groupings of individuals within enclosed area 300—Cluster A 340, Cluster B 345, and Cluster C 350. Such clusters may depict individuals located near a gate and who have gathered to board an airplane, for example. There are also some individuals who are located far away from any clusters and therefore are not considered to be a part of any of the clusters. In this example, Individual A 355, Individual B 360, Individual C 365, Individual D 370, and Individual E 375 are depicted.

As shown, FIG. 3 illustrates an overview of an enclosed area 300 that is similar to enclosed area 100 shown in FIG. 1. However, enclosed area 300 of FIG. 3 further illustrates Emergency Event A 380. For example, an emergency event server may receive information indicating a nature and a location of Emergency Event A 380. As discussed above, an emergency event server may notify a location server of an emergency event. The location server may thereafter determine routing instructions to route one or more mobile devices away from an emergency event based upon one or more factors. One factor that may be considered by an emergency event server is a nature or characterization of an emergency event. For example, an emergency event may be associated with one or more categories of emergency events. Such categories may be associated with an emergency level dependent upon a nature, such as a relative degree of danger, of the emergency event. An emergency level may be determined for an emergency event based at least in part on a predefined association, of emergency levels with various types of emergency events. An emergency level may be determined by an emergency event server in one or more implementations. For example, a fire may be associated with a high emergency level because individuals near the fire are likely to be injured by the fire, whereas a broken window may be associated with a relatively lower emergency level because individuals near the broken window are less likely to be injured by the broken window.

If, for example, an Emergency Event A is associated with a relatively high emergency level, routing instructions may be transmitted to instruct individuals within a predefined proximity of Emergency Event A to immediately exit via the closest exit. Mobile devices may execute a routing application and may present a digital map associated with an enclosed area on a display screen, for example. Routing instructions may be generated by a location server in some implementations and transmitted to mobile devices. In implementations where a mobile device is registered with a location server, such routing instructions may be tailored to a particular individual based at least in part on an emergency level associated with Emergency Event A, for example. Such routing instructions may be presented on a display screen of a mobile device. For example, an arrow pointing to a nearby exit may be displayed on a digital map. In some implementations, audible routing instructions may be presented via a speaker or earphones, for example.

In implementations where a mobile device is not registered with a location server, the location server may not have knowledge of which individuals are located within a certain proximity of Emergency Event A or a proximity of any of the individuals to Emergency Event A. Accordingly, generic routing instructions may be broadcast to such unregistered mobile devices. For example, a mobile device may receive broadcast routing instructions and an individual may therefore be alerted of a type and location of Emergency Event A and may be instructed to move to a location away from Emergency Event A.

In the example shown in FIG. 3, for example, individuals within Cluster A 340 may exit via Gate G 335, individuals within Cluster B 345 may exit via Gate A 305, and individuals within Cluster C 350 may exit via Gate D. Individuals A 355 and E 375 may exit via Gate C 315, Individual B 360 may exit via Gate E 325, and Individuals C 365 and D 370 may exit via Gate A 305.

As shown, individuals in Cluster B 345 are located closer to Gate B 310 than they are to Gate A 305. However, Gate A 305 may be much wider or larger than Gate B 310 and may therefore accommodate an evacuation of a larger number of individuals at a time. Accordingly, in this example, individuals in Cluster B 345 may be routed to the larger Gate A 305 instead of the smaller Gate B 310.

As shown in FIG. 3, all individuals within Cluster C 350, for example, may exit via Gate D 320 in the event that Emergency Event A 380 is associated with a high emergency level. However, if there are many individuals within Cluster C 350 but only a small number of individuals are able to exit via Gate D 320 at a particular time, some individuals may remain within enclosed area 300 for a relatively long amount of time. Accordingly, routing instructions to route individuals away from Emergency Event A 380 may be based at least in part on a population of individuals within enclosed area 300, such as a number of individuals within a cluster or grouping and a location of such a cluster or grouping.

If Emergency. Event A 380 is associated with a relatively low emergency level, some individuals within Cluster B 345, for example, may be routed to exit via Gate B 310 instead of via Gate A 305. If individuals within Cluster B 345 are registered with a location server, such tailored routing instructions may be determined and transmitted to mobile devices of individuals within Cluster B 345 to route some of the individuals to exit via Gate A 305 and other of the individuals to exit via Gate B 310. By routing some of the individuals within a cluster to different gates or exits, individuals may be efficiently evacuated from a certain proximity of Emergency Event A 380.

A location of an emergency event may affect particular routing instructions to evacuate enclosed area 300. In the example shown in FIG. 3, Emergency Event A 380 is located in a middle portion of enclosed area 300 and therefore generally does not obstruct a pathway to an exit such as a gate. It should be appreciated, however, that if an emergency event does obstruct a pathway to an exit, different routing instructions may instead be determined to route individuals away from the emergency event.

Figure 4:
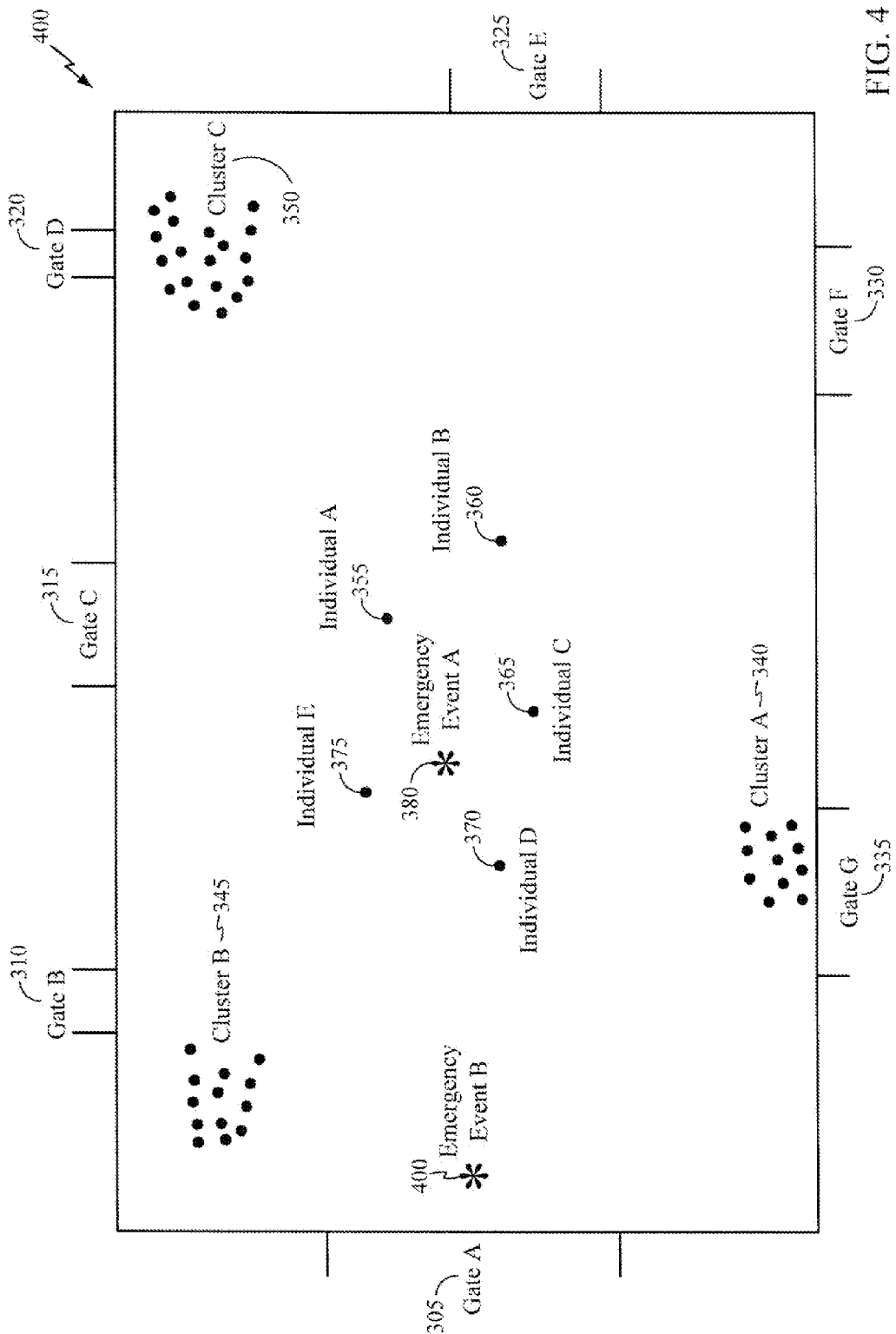
FIG. 4 illustrates a view of an enclosed area according to one or more implementations.

FIG. 4 illustrates a view of an enclosed area 400 according to one or more implementations. In this example, enclosed area 400 illustrates the same general layout and Emergency Event A 380 as does enclosed area 300 shown in FIG. 3. However, enclosed area 400 of FIG. 4 also illustrates a second emergency event, Emergency Event B 405, located near Gate A 305. Accordingly, in this example, it may not be safe for individuals to exit, via Gate A 305. Instead, for example, individuals may be routed to other gates even if the other gates are smaller or located farther away. For example, individuals in Cluster B 345 may be routed to exit via Gate B 310 and/or Gate C 315 depending at least in part on natures and locations of Emergency Events A 380 and B 405.

Some types of emergency events not require individuals to completely exit a structure. For example, if a security breach is detected where an airport passenger has entered a secure area without appropriate checks, it may not be desirable for individuals to exit a terminal via certain pathways, such as emergency exits. Instead, individuals within a terminal may be routed to a specific gate to exit the terminal and be re-screened.

Figure 5:
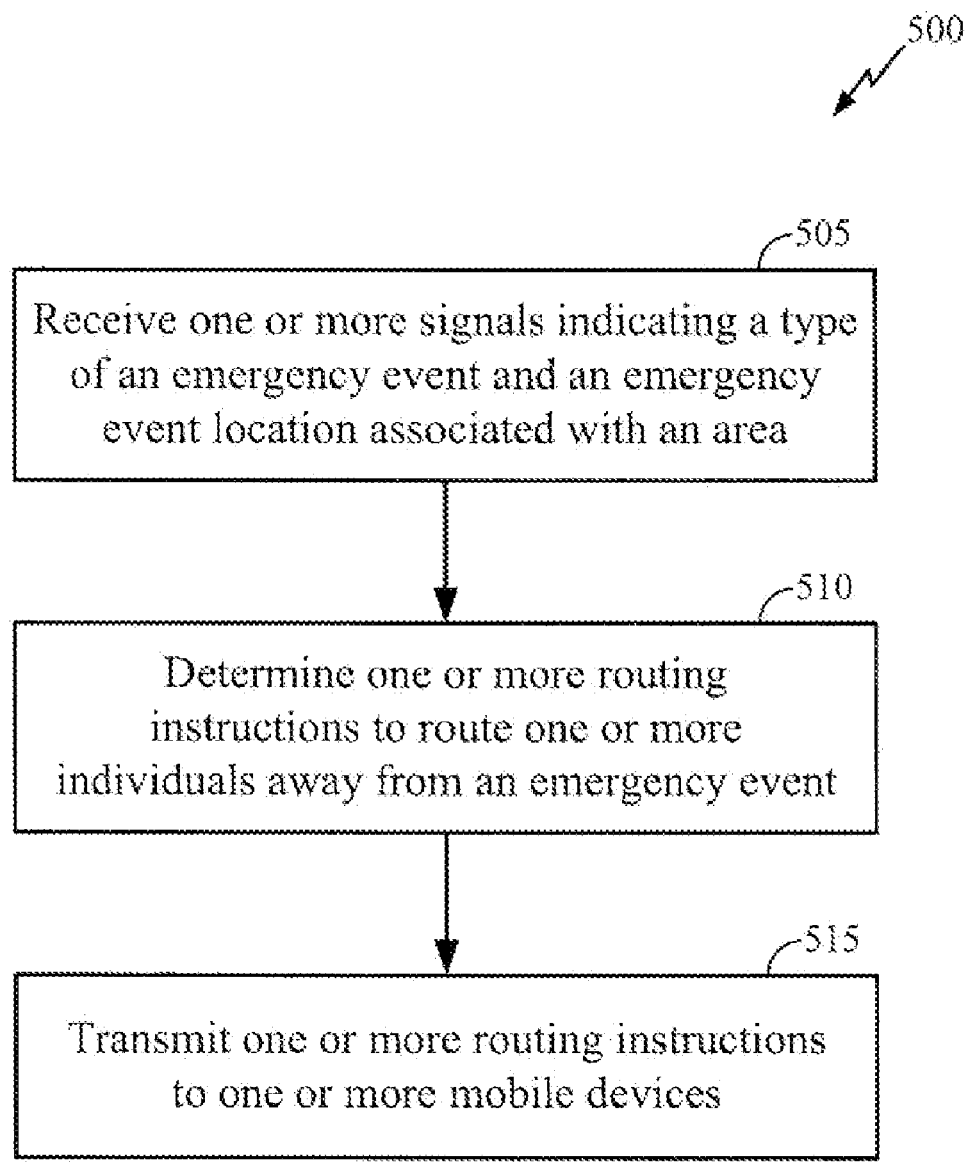
FIG. 5 is a flow diagram of a process for determining routing instructions to route one or more individuals away from an emergency event according to one or more implementations.

FIG. 5 is a flow diagram of a process 500 for determining routing instructions to route one or more individuals away from an emergency event. First, at operation 505, one or more signals may be received that indicate a type of an emergency event and an emergency event location associated with an area. Such an emergency event may be occurring within an enclosed area may be associated with at least one category of a plurality of categories. Examples of categories include "life-threatening," "terrorism threat," and "non-life threatening emergency," to name just a few among many different examples. Next, at operation 510, one or more routing instructions may be determined to route one or more individuals away from a location corresponding to the emergency event based at least in part on the at least one category associated with the emergency event. Finally, at operation 515, the one or more routing instructions may be transmitted via one or more electronic signals to one or more mobile devices associated with the one or more individuals. For example, a processor may initiate transmission of the one or more routing instructions by transmitting a control signal to a transmitter to instruct the transmitter to transmit the one or more routing instructions.

In some implementations discussed above, a location server may determine routing instructions to route one or more individuals away from an emergency event and may transmit such routing instructions to an individual's mobile device. For example, routing instructions may comprise a first set of routing instructions associated with a first group of individuals and at least a second set of routing instructions associated with a second group of individuals.

However, it should be appreciated that in some implementations, a routing application executing on an individual's mobile device may instead determine such routing instructions. For example, an emergency event server may broadcast an emergency level and location of an emergency event as well as other information descriptive of the emergency event, and its location. Such information may be received by an individual's mobile device. Upon receipt of such information, a routing application may determine routing instructions to route an individual away from Emergency Event A.

Figure 6:
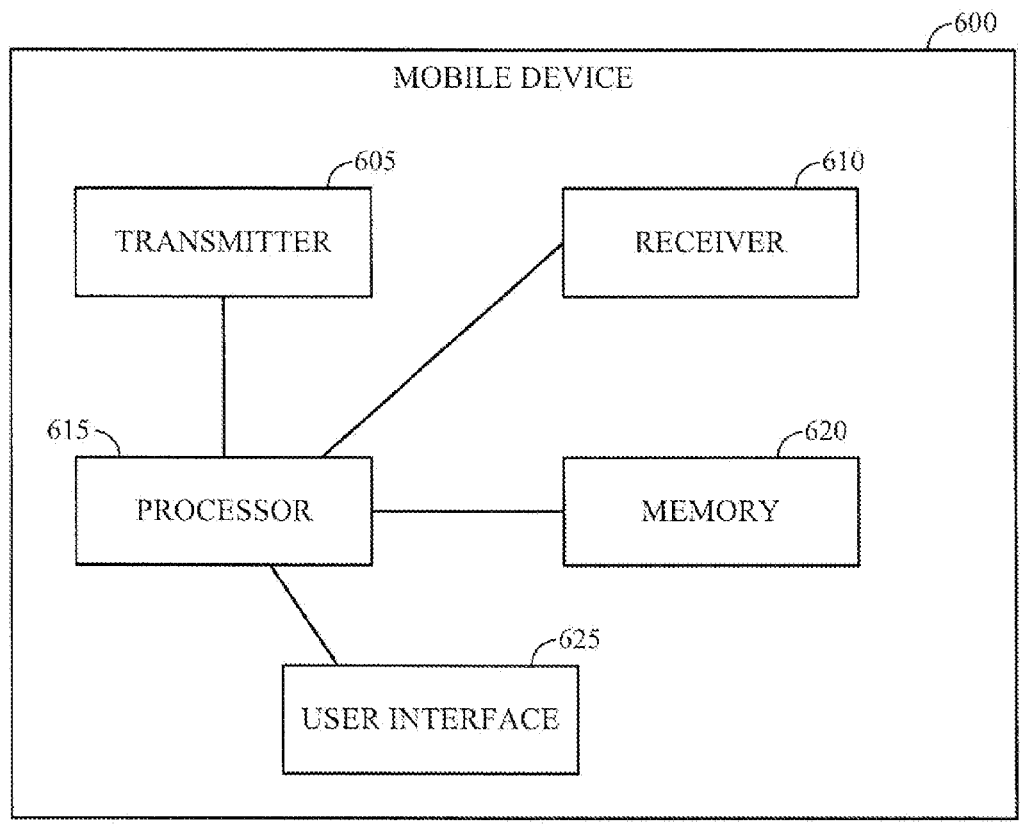
FIG. 6 is a schematic block diagram of a mobile device according to one or more implementations.

FIG. 6 is a schematic block diagram of a mobile device 600 according to one or more implementations. Mobile device 600 may include a transmitter 605, receiver 610, processor 615, memory 620, and user interface 625, for example. Transmitter 605 may transmit wireless signals to a network element or a location server, for example. Receiver 610 may receive one or more wireless signals from one or more wireless devices within an indoor environment and may an emergency map and/or routing instructions to route an individual away from an emergency event.

Processor 615 may be adapted to control various elements of mobile device 600, such as transmitter 605, receiver 610, processor 615, memory 620, and user interface 625, for example. Processor 615 may also be adapted to determine location information for mobile device 600 based at least in part on wireless signals received from wireless devices within an indoor environment. For example, processor 615 may be adapted to estimate a range from a wireless device based at least in part on an RSSI of a received signal and/or a time delay between transmission of such a signal from the wireless device and receipt by receiver 610 of mobile device 600.

A storage medium such as memory 620 may store emergency maps, routing instructions, and/or other information received from network elements or servers, such as an emergency event server or a location server. Memory 620 may also store program code executable by processor 615. User interface 625 may include one or more output devices, such as a display device or speaker. User interface 625 may also include one or more user input devices, such as a touch screen, keyboard, touchpad, or any other device capable of receiving an input from a user.

Figure 7:
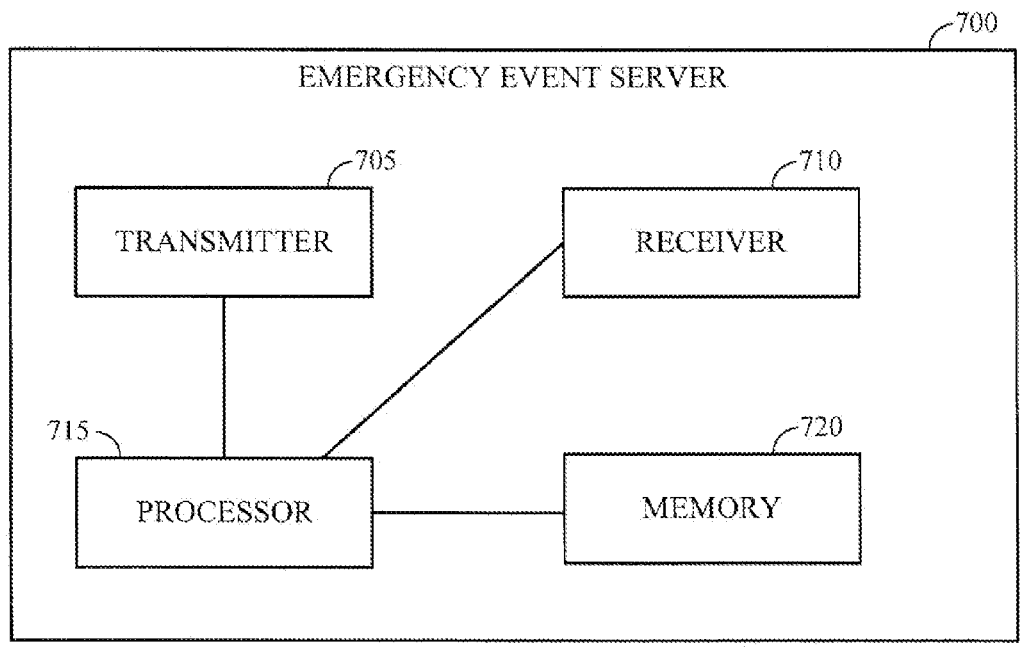
FIG. 7 is a schematic block diagram of an emergency event server according to one or more implementations.

FIG. 7 is a schematic block diagram of an emergency event server 700 according to one or more implementations. As shown, emergency event server 700 may include a processor 705, receiver 710, transmitter 715, and memory 720, for example. Receiver 710 may receive signals from emergency event detectors, location servers, or other network elements. Some of such signals may indicate locations and natures of emergency events and/or locations of mobile devices with an enclosed area. Transmitter 715 may transmit information relating to an emergency event to a location server via one or more signals. Such a location server may determine routing instructions to route one or more mobile devices away from the emergency event.

Processor 705 may receive information indicative of an emergency event and may associate the emergency event with one or more categories of emergency events. Such categories may be based at least in part on a danger level associated with an emergency event in some implementations. Memory 720 may store program code or instructions executable by processor 705.

Figure 8:
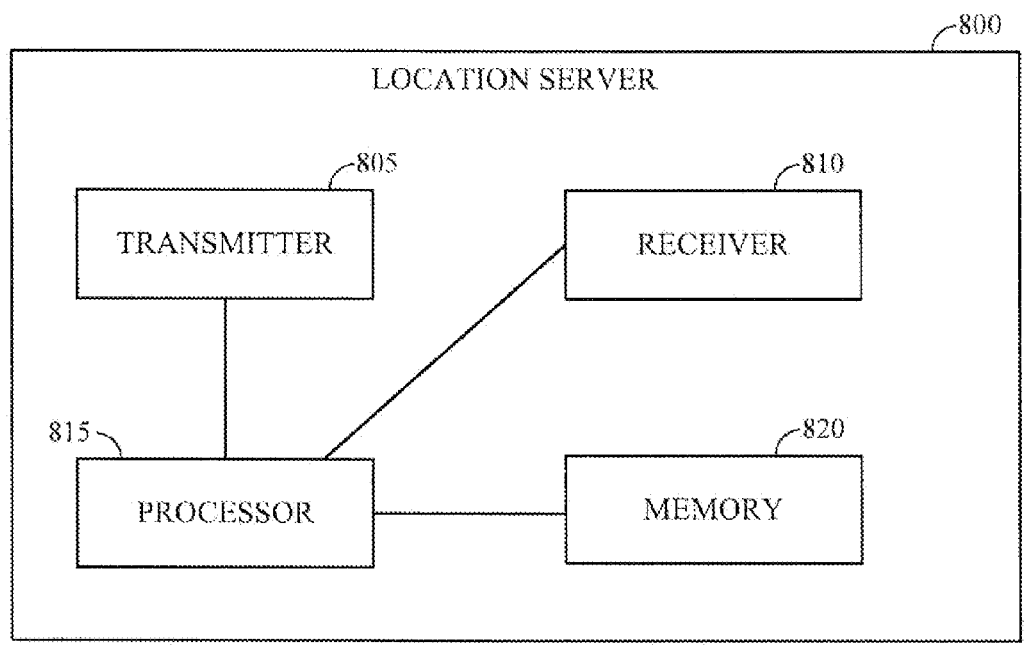
FIG. 8 is a schematic block diagram of a location server according to one or more implementations.

FIG. 8 is a schematic block diagram of a location server 800 according to one or more implementations. As shown, location server 800 may include a processor 805, receiver 810, transmitter 815, and memory 820, for example. Receiver 810 may receive signals from an emergency event server. For example, such signals may indicate emergency events and locations and emergency levels associated with the emergency events with an enclosed area. Processor 805 may determine routing instructions to route one or more mobile devices away from the emergency event. Such categories may be based at least in part on a danger level associated with an emergency event in some implementations.

Transmitter 815 may transmit information relating to an emergency event to one or more mobile devices. For example, transmitter 815 may transmit routing instructions to mobile devices registered with location server 800. Memory 820 may store program code or instructions executable by processor 805.

Some portions of the detailed description above are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the above discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. For example, a specific computing apparatus may comprise one or more processors programmed with instructions to perform one or more specific functions.

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

For a firmware and/or hardware/software implementations, certain methodologies may be implemented with modules (e.g., procedures, functions, and so on) that perform the functions described herein. Any machine-readable medium tangibly embodying instructions may be used in implementing the methodologies described herein. For example, software codes may be stored in a memory of a mobile station and/or an access point and executed by a processing unit of the device. Memory may be implemented within a processing unit and/or external to the processing unit. As used herein the term "memory" refers to any type of long term, short term, volatile, nonvolatile, or other memory and is not to be limited to any particular type of memory or number of memories, or type of media upon which memory is stored.

If implemented in hardware/software, functions that implement methodologies or portions thereof may be stored on and/or transmitted over as one or more instructions or code on a computer-readable medium. A computer-readable medium may take the form of an article of manufacture. A computer-readable medium may include computer storage media and/or communication media including any medium that facilitates transfer of a computer program from one place to another. A storage media may be any available media that may be accessed by a computer or like device. By way of example but not limitation, a computer-readable medium may comprise RAM, ROM, EEPROM, CD-ROM or other optical disk storage, magnetic disk storage or other magnetic storage devices, or any other medium that may be used to carry or store desired program code in the form Of instructions or data structures and that may be accessed by a computer.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing unit having a command set which includes the encoded commands. Such an instruction may be encoded in the form of a machine language understood by the processing unit. Again, these are merely examples of an instruction and claimed subject matter is not limited in this respect.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method, comprising:
   storing an estimated position of one or more mobile devices, wherein the one or more mobile devices are in an enclosed area, and wherein each of the one or more mobile devices is associated with an individual;
   receiving one or more signals indicating a type of an emergency event and an emergency event location associated with the enclosed area;
   determining one or more routing instructions to route the one or more individuals away from the emergency event location based on the emergency event location, the type of the emergency event, the number of stored estimated positions in the enclosed area, and a size of an exit along a route; and
   transmitting the one or more routing instructions to the one or more mobile devices associated with the one or more individuals.

2. The method of claim 1, further comprising associating the emergency event with at least one category of a plurality of categories.

3. The method of claim 2, wherein the one or more routing instructions are based at least in part on the at least one category associated with the emergency event.

4. The method of claim 1, wherein the one or more routing instructions comprise a first set of routing instructions and at least a second set of routing instructions, the method further comprising:
   transmitting the first set of routing instructions to a first group of individuals and the at least the second set of routing instructions to a second group of individuals.

5. The method of claim 4, further comprising associating an individual with the first or the second group of individuals based at least in part on information indicative an estimated location of the individual.

6. The method of claim 1, further comprising registering the one or more mobile devices associated with the one or more individuals with a location server.

7. The method of claim 1, wherein the enclosed area is associated with structural boundaries.

8. The method of claim 1, wherein the one or more routing instructions are determined based at least in part on a number of individuals located within a predefined range of the emergency event location.

9. The method of claim 1, wherein the one or more routing instructions are determined based at least in part on locations of one or more exit points within the enclosed area.

10. The method of claim 2, wherein the plurality of categories are based at least in part on an emergency level associated with the emergency event.

11. The method of claim 1, wherein transmitting the one or more routing instructions comprises broadcasting the one or more routing instructions.

12. An apparatus, comprising:
   a receiver to receive one or more input signals transmitted in a communications network;
   a transmitter to transmit one or more output signals;
   a processor adapted to:
      store an estimated position of one or more mobile devices, wherein each of the one or more mobile devices is associated with an individual;
      determine one or more routing instructions to route the one or more individuals away from an emergency event location corresponding to an emergency event based on the emergency event location, a type of the emergency event, the number of stored estimated positions within an enclosed area, and a size of an exit along a route; and
      initiate transmission of the one or more routing instructions to the one or more individuals via the transmitter, wherein at least one of the one or more input signals indicates an area associated with the emergency event location.

13. The apparatus of claim 12, wherein the processor is adapted to associate the emergency event with at least one category of a plurality of categories.

14. The apparatus of claim 13, wherein the one or more routing instructions are based at least in part on the at least one category associated with the emergency event.

15. The apparatus of claim 12, wherein the one or more routing instructions comprise a first set of routing instructions and at least a second set of routing instructions, and the transmitter is adapted to transmit the first set of routing instructions to a first group of individuals and the at least the second set of routing instructions to a second group of individuals.

16. The apparatus of claim 15, wherein the processor is adapted to associate an individual with the first or the second group of individuals based at least in part on the stored estimated position of the mobile device associated with the individual.

17. The apparatus of claim 12, wherein the one or more individuals are registered with a location server.

18. The apparatus of claim 12, wherein the enclosed area is associated with structural boundaries.

19. The apparatus of claim 12, wherein the processor is adapted to determine the one or more routing instructions based at least in part on a number of individuals located within a predefined range of the emergency event location.

20. The apparatus of claim 12, wherein the processor is adapted to determine the one or more routing instructions based at least in part on locations of one or more exit points within the area.

21. The apparatus of claim 13, wherein the plurality of categories are based at least in part on an emergency level associated with the emergency event.

22. The apparatus of claim 12, wherein the transmitter is adapted to broadcast the one or more routing instructions.

23. An apparatus, comprising:
means for storing an estimated position of one or more mobile devices, wherein the one or more mobile devices are in an enclosed area, and wherein each of the one or more mobile devices is associated with an individual;
means for receiving one or more signals indicating a type of an emergency event and an emergency event location associated with the enclosed area;
means for determining one or more routing instructions to route the one or more individuals away from the emergency event location based on the emergency event location, the type of the emergency event, the number of stored estimated positions in the enclosed area, and a size of an exit along a route; and
means for transmitting the one or more routing instructions to the one or more mobile devices associated with the one or more individuals.

24. The apparatus of claim 23, further comprising means for associating the emergency event occurring within the area with at least one category of a plurality of categories.

25. The apparatus of claim 24, further comprising means to determine the one or more routing instructions based at least in part on the at least one category associated with the emergency event.

26. The apparatus of claim 23, wherein the one or more routing instructions comprise a first set of routing instructions and at least a second set of routing instructions, the apparatus further comprising means for transmitting the first set of routing instructions to a first group of individuals and the at least the second set of routing instructions to a second group of individuals.

27. The apparatus of claim 26, further comprising means for associating an individual with the first or the second group of individuals based at least in part on the stored estimated position of the mobile device associated with the individual.

28. The apparatus of claim 23, further comprising means for registering the one or more individuals with a location server.

29. The apparatus of claim 23, wherein the enclosed area is associated with structural boundaries.

30. The apparatus of claim 23, further comprising means for determining the one or more routing instructions based at least in part on a number of individuals located within a predefined range of the emergency event location.

31. The apparatus of claim 23, further comprising means for determining the one or more routing instructions based at least in part on locations of one or more exit points within the enclosed area.

32. The apparatus of claim 24, wherein the plurality of categories are based at least in part on an emergency level associated with the emergency event.

33. The apparatus of claim 21, further comprising means for broadcasting the one or more routing instructions.

34. An article, comprising:
a non-transitory storage medium comprising machine-readable instructions executable by a special purpose apparatus to:
store an estimated position of one or more mobile devices, wherein the one or more mobile devices are in an enclosed area, and wherein each of the one or more mobile devices is associated with an individual;
process one or more signals indicating an emergency event occurring within an emergency event location associated with the enclosed area;
determine one or more routing instructions to route the one or more individuals away from the emergency event location corresponding to the emergency event based on the emergency event location, a type of the emergency event, the number of stored estimated positions within the enclosed area, and a size of an exit along a route; and
initiate transmission of the one or more routing instructions to the one or more mobile devices associated with the one or more individuals.

35. The article of claim 34, wherein the machine-readable instructions are further executable by the special purpose apparatus to associate the emergency event occurring within the area with at least one category of a plurality of categories.

36. The article of claim 35, wherein the machine-readable instructions are further executable by the special purpose apparatus to determine the one or more routing instructions based at least in part on the at least one category associated with the emergency event.

37. The article of claim 34, wherein the one or more routing instructions comprise a first set of routing instructions and at least a second set of routing instructions, wherein the machine-readable instructions are further executable by the special purpose apparatus to initiate transmission of the first set of routing instructions to a first group of individuals and the at least the second set of routing instructions to a second group of individuals.

38. The article of claim 37, wherein the machine-readable instructions are further executable by the special purpose apparatus to associate an individual with the first or the second group of individuals based at least in part on the stored estimated position of the mobile device associated with the individual.

39. The article of claim 34, wherein the machine-readable instructions are further executable by the special purpose apparatus to register the one or more individuals with a location server.

40. The article of claim 34, wherein the machine-readable instructions are further executable by the special purpose apparatus to determine the one or more routing instructions based at least in part on a number of individuals located within a predefined range of the emergency event location.

41. The article of claim 34, wherein the machine-readable instructions are further executable by the special purpose apparatus to determine the one or more routing instructions based at least in part on locations of one or more exit points within the enclosed area.

42. The article of claim 35, wherein the plurality of categories are based at least in part on an emergency level associated with the emergency event.

43. The article of claim 34, wherein the machine-readable instructions are further executable by the special purpose apparatus to broadcast the one or more routing instructions.

44. The article of claim 34, wherein the enclosed area is associated with structural boundaries.

45. A method, comprising:
receiving, by a mobile device, a signal indicating a type of an emergency event and an emergency event location associated with an area, wherein the mobile device is associated with an individual;

determining one or more routing instructions to route the individual away from the emergency event location based on the emergency event location, the type of the emergency event, an estimated location of the mobile device, a presence of one or more other mobile devices, and a size of an exit along a route; and presenting the one or more routing instructions to the individual.

46. The method of claim 45, wherein the area comprises an enclosed area associated with structural boundaries.

47. The method of claim 45, wherein the one or more routing instructions are determined based at least in part on locations of exit points within the area.

48. The method of claim 45, wherein the presenting the one or more routing instructions comprises generating one or more electronic display signals to present the one or more routing instructions on a display device.

49. The method of claim 45, wherein the presenting the one or more routing instructions comprises generating one or more electronic audio signals to present the one or more routing instructions via one or more speakers.

50. The method of claim 45, wherein the type of the emergency event is determined based at least in part on at least one category associated with the emergency event.

51. An apparatus, comprising:
a processor adapted to:
process one or more wireless signals received from a communications network and indicating a type of an emergency event and an emergency event location within an area; and
determine one or more routing instructions to route an individual away from the emergency event location based on the emergency event location, the type of the emergency event, a number and a proximity of one or more other individuals, an estimated location of a mobile device, and a size of an exit along a route; and
an output device to present the one or more routing instructions to the individual.

52. The apparatus of claim 51, wherein the area comprises an enclosed area associated with structural boundaries.

53. The apparatus of claim 51, wherein the processor is further adapted to determine the one or more routing instructions based at least in part on locations of exit points within the area.

54. The apparatus of claim 51, wherein the output device comprises a display device adapted to present the one or more routing instructions.

55. The apparatus of claim 51, wherein the output device comprises one or more speakers to audibly present the one or more routing instructions.

56. The apparatus of claim 51, wherein the type of the emergency event is based at least in part on an emergency level associated with the emergency event.

57. An apparatus, comprising:
means for processing one or more wireless signals indicating a type of an emergency event and an emergency event location within an area;
means for determining or more routing instructions to route an individual away from the emergency event location based on the emergency event location, the type of the emergency event, a number and a proximity of one or more other individuals, an estimated location of a mobile device, and a size of an exit along a route; and
means for presenting the one or more routing instructions to the individual.

58. The apparatus of claim 57, further comprising means for receiving the one or more wireless signals.

59. The apparatus of claim 57, further comprising means for determining the one or more routing instructions based at least in part on locations of exit points within the area.

60. The apparatus of claim 57, wherein the area comprises an enclosed area associated with structural boundaries.

61. The apparatus of claim 57, wherein the means for presenting comprises a display device adapted to present the one or more routing instructions.

62. The apparatus of claim 57, wherein the means for presenting comprises one or more speakers to audibly present the one or more routing instructions.

63. The apparatus of claim 57, wherein the type of the emergency event is based at least in part on an emergency level associated with the emergency event.

64. An article, comprising:
a non-transitory storage medium comprising machine-readable instructions executable by a special purpose apparatus to:
process one or more wireless signals indicating a type of an emergency event and an emergency event location within an area;
determine one or more routing instructions to route an individual away from the emergency event location based on the emergency event location, the type of the emergency event, a number and a proximity of one or more other individuals, an estimated location of a mobile device, and a size of an exit along a route; and
generate one or more electronic signals to present the one or more routing instructions to the individual.

65. The article of claim 64, wherein the machine-readable instructions are further executable by the special purpose apparatus to determine the one or more routing instructions based at least in part on locations of exit points within the area.

66. The article of claim 64, wherein the area comprises an enclosed area associated with structural boundaries.

67. The article of claim 64, wherein the machine-readable instructions are further executable by the special purpose apparatus to generate one or more electronic display signals to present the one or more routing instructions on a display device.

68. The article of claim 64, wherein the machine-readable instructions are further executable by the special purpose apparatus to generate one or more electronic audio signals to present the one or more routing instructions via one or more speakers.

69. The article of claim 64, wherein the type of the emergency event is based at least in part on an emergency level associated with the emergency event.

\* \* \* \* \*